(12) United States Patent
Panzavolta

(10) Patent No.: US 11,610,177 B2
(45) Date of Patent: Mar. 21, 2023

(54) METHOD, SYSTEM AND COMPUTER PROGRAM PRODUCT FOR TRACKING OF A FINITE AMOUNT OF LIQUID VOLUME WHICH IS INDIVIDUALIZED IN VOLUME UNITS

(71) Applicant: AUTHENA AG, Zug (CH)

(72) Inventor: Matteo Panzavolta, Rüschlikon (CH)

(73) Assignee: AUTHENA AG, Zug (CH)

( * ) Notice: Subject to any disclaimer, the term of this patent is extended or adjusted under 35 U.S.C. 154(b) by 551 days.

(21) Appl. No.: 16/696,303

(22) Filed: Nov. 26, 2019

(65) Prior Publication Data
US 2021/0158273 A1    May 27, 2021

(51) Int. Cl.
*G06Q 10/08*      (2012.01)
*G06Q 10/087*     (2023.01)
(Continued)

(52) U.S. Cl.
CPC .......... *G06Q 10/087* (2013.01); *G01F 22/00* (2013.01); *G01S 19/01* (2013.01); *G06F 16/27* (2019.01);
(Continued)

(58) Field of Classification Search
CPC ....... G06Q 10/087; H04W 4/80; G06F 16/27; G01F 22/00
(Continued)

(56) References Cited

U.S. PATENT DOCUMENTS

| | | | | |
|---|---|---|---|---|
| 9,550,662 | B1* | 1/2017 | Brown | G07F 13/025 |
| 2004/0217124 | A1* | 11/2004 | Crisp, III | G06Q 20/203 |
| | | | | 222/25 |
| 2011/0042458 | A1* | 2/2011 | Falci | B67D 1/04 |
| | | | | 222/399 |
| 2021/0325215 | A1* | 10/2021 | Bond | G01F 25/0084 |

FOREIGN PATENT DOCUMENTS

| | | |
|---|---|---|
| WO | 2016/064687 A1 | 4/2016 |
| WO | 2016/168089 A1 | 10/2016 |

*Primary Examiner* — Ahshik Kim
(74) *Attorney, Agent, or Firm* — Pearne & Gordon LLP

(57) ABSTRACT

An invention relating to a method, a system, a container and a computer program product concerned with tracking a finite amount of liquid volume which is individualized into volume units. Each volume unit (Vu) comprises a define subset of volume from the finite amount of liquid volume (V). The liquid volume (V) is moved as volume units (Vu) and/or volume unit batch along a series of blocks in a network. The method comprises the steps of generating an identification representative of the specific liquid volume upon generation of that volume, storing that identification on a wirelessly readable communication unit applied on a single volume unit and/or single volume unit batch of the liquid volume, reading that identification by means of at least one first data acquisition unit upon movement of the single volume unit into a specific block in the network and enriching the identification with a specific block identification to form a first block identification and storing that first block identification on a distributed ledger. That last step can be repeated for each movement of the single unit from a parent block into a child block and thereby storing a numbering of (Continued)

subsequent block identification on the distributed ledger for each block the movement into is performed. Finally, an access to the volume unit in any one of the blocks in a network is recorded by means of the wirelessly readable communication unit and reflected in a subsequent reading of the identification.

20 Claims, 2 Drawing Sheets

(51) Int. Cl.
  *G01S 19/01* (2010.01)
  *G01F 22/00* (2006.01)
  *H04W 4/80* (2018.01)
  *G06F 16/27* (2019.01)
  *G06K 7/10* (2006.01)
  *G06Q 30/018* (2023.01)
(52) U.S. Cl.
  CPC ..... *G06K 7/10297* (2013.01); *G06Q 30/0185* (2013.01); *H04W 4/80* (2018.02)
(58) Field of Classification Search
  USPC .......................................................... 705/55
  See application file for complete search history.

(56) References Cited

* cited by examiner

METHOD, SYSTEM AND COMPUTER PROGRAM PRODUCT FOR TRACKING OF A FINITE AMOUNT OF LIQUID VOLUME WHICH IS INDIVIDUALIZED IN VOLUME UNITS

The present invention relates to the field of methods for tracking a finite amount of liquid volume which is individualized in volume units, and where each volume unit comprises a defined subset of volume from the finite amount of liquid volume.

The present invention further relates to a system for tracking a finite amount of liquid volume that is individualized in volume units, as well as a computer program product comprising instructions for performing the said method, all according to the preambles of the independent claims.

BACKGROUND OF THE INVENTION

Producers and consumers of luxury goods or other rare products that are sold in individualized units of defined volume are often faced with grey market sales or outright fraud undermining their revenues. For some liquid products that are affected, such as high value spirits and wine, there have been cases of refilling used bottles or containers with cheaper substitutes. For some other types of goods, such as pharmaceutically relevant solvents and buffers, it might generally be favorable to be able to keep track of a total production volume even after it has been filled into individual containers that are distributed, traded and moved separately. For some solvents that have the potential to be abused to produce illegal substances, it might be required for regulatory compliance to know the exact amount of genuine solvent in the market and be able to track any single unit consumed from the total volume.

Thus, there is a need to protect against fraud and grey market by keeping track of the containers holding a certain amount of a liquid. Some of the presently used methods for doing so are derived from concepts used in the fashion and luxury goods markets. These methods often use holographic logos or seals. If applied for volume units of liquid, they might increase the burden for refillers somewhat.

Still, most of these solutions can be easily circumvented. Also, they do not help at all if the consumer, or just any target of a fraud, is uninformed and does not know how to look for these safety marks. Other solutions use QR codes that are readable by mobile devices for indicating the genuineness of the product, but even for these, the same limitations apply.

As tamper-proof seals are also a factor of consumer safety, solutions have come up that make use of Radio-frequency identification (RFID) based on electromagnetic fields to automatically identify and track tags attached to objects. The tags contain electronically-stored information and operate with a circuit or antenna that extends into the seal area. The tag then ceases to function, once the seal is broken.

More sophisticated tags have come up in the meantime, though. WO 2016/064687 suggests a mechanism based on detecting multiple valid states on an open container. It uses near field (NF) and radio frequency (RF) communication to detect an open container, while at the same time preserving the ability of the tags and devices to communicate wirelessly. This can indeed help at preventing grey market activity and refilling fraud. The tags have protection lines that are on a different substrate than the antenna. The protection lines sense or determine a continuity of a state of a package on the container. The NFC or RFID tags can then be equipped with payloads indicative of the identification number of the liquid in question. Still, as for outright forgery, there might be the possibility to restore the protection line and thereby the functionality of the seal as if it would have been intact.

WO 2016/168089 A1 relates to a sensor based NFC or radio frequency mechanism with multiple valid states. The goal is to prevent counterfeiting and grey market activity. This document suggests sensor based mechanisms for detecting or sensing the presence of one or more contents of a container in the environment outside the container, for instance an open, damaged or otherwise compromised container. As above, the ability of the tags to communicate wirelessly is retained after the container is opened. This can be archived by having a chemical sensor and detecting the tear in the packaging with means of the chemical sensor instead of a break or tear in an antenna of the tag. This system is comparatively expensive though. Furthermore, it might be prone to malfunction, as the content might come into contact with the sensor, without actually having been removed therefrom, for instance if a neighboring container breaks or spills. There is thus a need in the field to provide for a reliable and efficient way to securely register and track a finite quantity of a liquid that has been individualized.

DESCRIPTION OF THE INVENTION

It is an object of the present invention to provide a method, a system and a computer program product as initially described that provides for a reliable and efficient way to securely register and track a finite quantity of a liquid that has been individualized.

One aspect of the present invention concerns a method for tracking a finite amount of liquid volume which is individualized in volume units. Each volume unit comprises a defined subset of volume from the finite amount of liquid volume. The liquid volume is moved by means of these volume units and/or batches of these volume units along a series of blocks in a network.

The method of the present invention comprises the step of generating an identification representative of the specific liquid volume upon generation of said liquid volume. The method comprises further the step of storing that identification on a wirelessly readable communication unit applied on a single volume unit and/or a single volume unit batch of the liquid volume. The wirelessly readable communication unit can be a unit as described in any of either WO 2016/064687 or WO 2016/168089 A1, both herewith incorporated by reference, for example.

The method also comprises the step of reading said identification by means of at least one first data acquisition unit upon movement of the single volume unit into a specific block. The identification is then enriched with a specific block identification and forms together with the identification representative of the specific volume unit a first block identification, which is then stored on a distributed ledger. In a particular embodiment, the identification generated in the first step above is the first entry in the distributed ledger and each first or subsequent clock identification adds a further entry in a chain of entries linked to that particular identification.

This step can be repeated. Each movement of the volume unit from a parent block into a child block is accompanied by a further reading of the identification and a further enriching the identification with further block identification and ultimately storing the further block identification on the distributed ledger. Thereby subsequent block identification(s) is/are stored on the distributed ledger, each representative of the specific block, such that for each volume unit a chain of block identifications is stored, each linked to a parent block and the identification representative of the liquid volume in question.

The method of the present invention further comprises the step of recording by means of the wirelessly readable communication unit an access to the volume unit in anyone of the blocks in the network and reflecting such an access in any subsequent reading of the identification on the wirelessly readable communication unit as outlined above. Thereby a subset of volume as individualized in the specific volume unit is recorded as consumed. The wirelessly readable communication unit needs not to incorporate the feature of recording the access by itself, but it might suffice that it is in operative connection with an element adapted at detecting an access. The detecting of the access can be a passive detection, i.e. by sensing the absence of a circuit electric flow for instance, as it is used with protection lines and/or antennas extending into the seal area, or it can be an active detection, for instance by detecting oxygen or chemical reactions started by the influx of oxygen inside a container the volume unit is stored in. Alternatively, or additionally sensors adapted at measuring a sonic impedance and/or piezoelectric sensor might be used to detect the presence an access to the liquid.

The present invention provides an easy and tamper proof method of keeping track of a specific sub-volume of a limited volume of liquid, regardless of where it is located in a distribution network at a given timepoint. The method is not only tamper proof, but prevents product forgery by essentially removing the possibility of abusing and reutilizing genuine containers by refilling them with a replacement liquid.

The method of the present invention further provides a distinct advantage for each of a group of block owners, in that they can be supplied with information during the movement of the volume units along the network of blocks, in particular, the individual volume units moves into or out from at any given timepoint. Thereby a state of balance for a specific finite amount of liquid volume can be maintained in the network, further increasing distribution efficiencies.

In the context of the present invention, the finite amount of liquid volume shall be understood as a determined amount. The exact amount of liquid volume can be defined at the discretion of an owner of the producer block during generation of the liquid volume in question, for instance.

In the context of the present invention, a liquid shall be understood as any substance that shows fluid properties. This can be the case for liquids in the strict sense, such as beverages, solutions or emulsions, for instance, as well as for beads, pellets, pills and/or powder, and even for gases which can be considered to be in fluid stage when stored in a container.

In the context of the present invention, an individualized volume unit can be understood as a specific defined subset of volume of the total volume in question. In practical terms the volume units can comprise units as usually used for moving the volume in question. Examples of such volume units can range from as low as a couple microliters up to several hectoliters that can be stored in containers, such as bottles, barrels, casks, tanks or vials, for instance.

In the context of the present invention, the generation of said liquid volume shall not be understood as the act of generating that liquid volume per se, but a virtual generation by determining and deciding a movement of the liquid volume in a defined amount and in individualized units. This, of course, can coincide with the act of generating the liquid volume in question, for instance when the method of the present invention is used for regulating a process chain. In other examples, though, the generation is dependent on a first block owner's decision of moving the liquid volume into a network, and thereby starting a track keeping process as described in the method of the present invention.

In the context of the present invention, a batch of volume units can be understood as any type of grouping of individualized volume units that still separately contain each volume unit but moves them in a grouped entity. These batches can range, for example, from 2 to hundreds of individual volume units. Most commonly, for beverages the batches come in numbers of 6, 12, 24 and/or 36 volume units moved together.

In the context of the present invention, a liquid volume can be seen defined as volume X, and a volume unit as a fraction of that volume unit.

In the context of the present invention, a recording defining a volume unit as consumed can be understood as having the volume unit, respectively the specific fraction of volume from the liquid volume counting as removed from the network.

In the context of the present invention, the term consumed shall not be strictly construed as meaning only a consumption in the strict sense of the word, but can already encompass the access to the volume unit. This could result in a state of being tainted or tampered with for the volume unit. As soon as an access to the liquid is recorded, the method of the present invention can comprise a step of removing that defined subset of volume in the volume unit in question from a liquid volume and record that removal on the digital ledger.

With this method, a consolidation of all chains of the distributed ledger relating to a specific identification representative of a specific liquid volume leads to a total amount of liquid volume still in an untampered and untainted state. This state can, for instance, be considered a genuine state of a volume unit.

In a particular embodiment, a first chain is generated on the distributed ledger when the identification representative of the specific liquid volume is generated. This chain is representative of the specific liquid volume and an individual chain can be generated for each volume unit. Each block identification can correspond to a specific node of the chain.

In the context of the present invention, a chain can be understood as a string of nodes. As each node can correspond to a specific block, the chain can reflect the network along which the individual volume units are moved.

In an even more particular embodiment, the chain is characterized by each node after the first having at least one parent node and at least one filial node. The last and the first node being an exception, as the first node does not have a parent node, and the last no filial node. Upon generation of the identification, the parent node is created on the distributed ledger. Each subsequent block is represented on the chain by a filial node. A filial node can perform the role of a parent node to a subsequent block.

In a particular embodiment of the present invention, each block corresponds to a specific node role. For instance, upon creation of the chain, a producer block is defined and a specific producer node is created as a parent node on the distributed ledger, thereby starting a chain. A subsequent filial block can be a distributor node forming the first filial node as a subsequent member of the previously generated chain. Further, a retailer block can be generated in analogues fashion, thereby forming the second filial node which is directly connected to the first filial node upstream and further downstream to a terminal node, which can be formed by a consumer block and a respective consumer node on the chain. In this most simple setup the filial blocks can reiterate indefinitely, whereas the parent, i.e. the producer block can exist only once. The cycle of reiteration is terminated for a specific volume unit, as soon as an access to the volume unit is recorded as described above.

In a particular embodiment, a chain is always terminated for a specific volume unit, as soon as an access to the volume unit is recorded as described above.

In a particular embodiment, the method according to the present invention comprises a reading of said identification by means of at least one first data acquisition unit, said reading comprising a radio frequency based transmission. In a further embodiment, the reading of that identification is performed by means of at least one first data acquisition unit based on a near field protocol transmission.

In a particular embodiment of the present invention, the method comprises performing each reading with a separate data acquisition unit, i.e. a second reading performed by means of at least one second data acquisition unit, a third reading performed by means of at least one third data acquisition unit, etc.

In a further particular embodiment, the subsequent reading of the identification following an access to the volume unit in any one of the blocks in the network is performed by means of a data acquisition unit adapted at reading by means of a near field protocol based transmission means.

In a further particular example, this specific data acquisition unit is a smartphone capable of performing readings based on a near field protocol transmission means.

In a specific embodiment of the present invention, the identification representative of the specific volume comprises one or more pieces of information relating to any one of: the type of the liquid, the place of generation of the liquid, the place of individualization of the liquid, the time of generation of the identification, the time of generation of the liquid, the time of individualization of the liquid, the specific liquid amount and further information.

In a particular embodiment, the method further comprises the step of consolidating and/or collating all block identifications of a chain, and generating a total consumed volume value out of the consolidated and/or collated block identifications comprising a recording of the corresponding defined subset of volume of the volume unit as consumed.

In a particular embodiment of the present invention, the method comprises further a step of generating a visualization representative of the specific liquid volume upon reading. More particularly, the visualization may be displayed on a display, which preferably can be adapted as a part of a data acquisition unit. The visualization may comprise one or more pieces of information relating to the type, total volume, provenience, number of previous readings, batch number, etc.

In a further preferred embodiment, the visualization may comprise information relating to the total volume still in the network and/or information relating to the total volume consumed or removed from the network. The said information can, for instance, comprise qualitative data relating to the product and amount of the product.

In a particular embodiment, the visualization may comprise graphical elements representative of any one or more of the previously described pieces of information.

In a further particular embodiment, a graphical representation indicative of the total volume in relation to the volume removed from the network (i.e. consumed) is shown.

Further, the graphical representation can comprise animations representative of the movement of the volume of the liquid into and out from the various blocks. For instance, a graphical representation indicative of each one of the blocks in a defined chain can be represented, which shows the total volume for each one of the blocks at essentially real-time and a real-time representation of the volume flow moving along the different blocks.

In a particular embodiment of the present invention, the step of generating the identification is performed by means of a producer node role attributed to a specific producer of the finite amount of liquid volume. This can be archived, for example, by making the generation of an identification dependent upon a producer node role.

In a particular embodiment, the specific block identification is generated by means of a distributor node role attributed to a specific distributor of a volume unit and/or volume unit batch.

In a further particular embodiment, the first subsequent block identification is generated by means of a retailer node role attributed to a specific retailer of a volume unit and/or volume unit batch.

In a further embodiment of the present invention, a subsequent block identification is generated by means of a consumer node role attributed to a specific consumer of a volume unit and/or volume unit batch.

Relating to the node roles, in a further preferred embodiment, the performing of any one of the steps of the method as described above may be made dependent upon an authentication of the node role of a specific user. This identification can be performed by means known in the art, for instance by biometric analysis or by application of a code.

In a preferred embodiment, the node role is specific to a particular action performed on a block of the network. In this embodiment, for instance, the actions performed on the specific block are each attributed with the particular node role representative of the block and recorded as such in the identification generated for storing on the distributed ledger.

In a particular embodiment of the present invention, during the reading of the identification by means of the at least one data acquisition unit, a localization unit, preferably a GPS tracker, generates data reflective of the place of the reading. This data may be stored in the respective identification generated by the reading. For instance, if the reading is performed in the first block following the generation of the identification, the specific block identification from the first block resulting in the first block identification upon enriching the identification of the volume unit may be further enriched with a specific information regarding the localization performed. Alternatively, a triangulation by means of network connectivity can be performed to determine the localization of a specific node role user.

In a particular embodiment of the present invention, an input is generated by means of the at least one data acquisition unit that generated data reflective of an event.

Even more preferred, the input is generated during the reading that identification by means of the at least one data acquisition unit. The event may be associated with a particular event relating to the movement of the volume unit in the network. The event may be a sale, storage, access of the volume unit and/or destruction of the volume unit for example. The event may be dependent on the node role of the user of the respective data acquisition unit. For instance, if the node role of the data acquisition unit user is determined as a consumer, the only event that can be recorded by means of applying the data acquisition unit on the volume unit is a recording of an access to the volume unit resulting in all the consequences detailed above.

In a particular embodiment, the method of the present invention comprises a further step of wirelessly uploading the first block identification and/or subsequent block identifications for storage on the distributed ledger. This uploading may be performed automatically by a software routine on the data acquisition unit responsible for a particular reading.

In a further embodiment of the present invention, the reading of the identification by means of at least one data acquisition unit is performed by an authorized user with a role attributed too, and the authorized user is attributed with a value upon forming the reading, which is stored on a user database.

In a preferred embodiment, the value is indicative of the number of readings the authorized user has performed.

In a further even more preferred embodiment, the value is represented as part of the graphical representation of a visualization as described above.

In a further preferred embodiment, the first block identification and/or subsequent block identifications comprise information reflective of the user performing the reading and further reflective of the block the volume unit is moving into and/or the block the volume unit is moving out from.

In a further embodiment of the present invention, a timestamp is generated with the step of generating the identification and again with each reading. This timestamp can be part of the enriching as described above and in the first identification and/or subsequent block identifications for storage on the distributed ledger. In a particular embodiment, the timestamp can be a trusted timestamp issued by a trusted third party.

According to a preferred embodiment of the present invention, the specific block identification or subsequent block identification may comprise information reflective of the authorized users of a particular node, role information, node information, status information, event information and/or information reflective of the location of the block, such as GPS information for instance.

Further advantageous embodiments are as follows:

a) The method of the present invention, further comprising the step of collating all block identifications of a chain and generating a total consumed volume value out of the collated block identifications comprising a recording the corresponding defined subset of volume of the volume unit as consumed.

b) The method of the present invention, comprising a further step of wirelessly uploading the first block identification and/or subsequent block identifications for storage on the distributed ledger (DL).

c) The method of the present invention, whereby the reading identification by means of at least one data acquisition unit is performed by an authorized user with a role attributed to and the authorized user is attributed with a value upon performing the reading, which is stored on a user database.

d) The method of the present invention, whereby the generating an identification (ID) is generated by means of a producer node role attributed to specific producer of the finite amount of liquid volume.

e) The method of the present invention, whereby the specific block identification is generated by means of a distributer node role attributed to a specific distributer of volume unit and/or volume unit batch.

f) The method of the present invention, whereby a first subsequent block identification is generated by means of a retailer node role attributed to a specific retailer of a volume unit and/or volume unit batch.

g) The method of the present invention, whereby a second subsequent block identification is generated by means of a consumer node role attributed to a specific consumer of a volume unit and/or volume unit batch.

One aspect of the present invention relies to a system for tracking a finite amount of liquid volume which is individualized in volume units. Each volume unit comprises a defined subset of volume from the finite amount of the liquid volume.

The system according the present invention further comprises a container for containing the volume unit and having a seal to confine the volume unit within the container.

In a preferred embodiment, the seal is a removable seal. The system also comprises a wirelessly readable communication unit, which is operatively connected to the seal and capable of storing a pregenerated identification representative of the specific liquid volume.

In a particular embodiment, the wirelessly readable communication unit is also capable of storing and wirelessly transferring a pregenerated identification that is representative of the integrity of the container.

The system of the present invention further comprises a first data acquisition unit capable of wirelessly reading the identification from the wirelessly readable communication unit. The system also comprises a number of blocks in a network, whereby each block is reflective of a particular stage in a chain of stages the volume unit moves through. Further, each block is adapted to provide a specific block identification to the identification. The system also comprises a distributed ledger for storing a first and any subsequent block identification. A wirelessly readable communication unit is adapted to record, by means of being operatively connected to the seal, an access to the volume unit in the container and reflect this access in any subsequent reading of the identification, such that the corresponding block identification recalls the volume as consumed on the distributed ledger.

In a particular embodiment, the first data acquisition unit further comprises a processor adapted to enrich the identification with the specific block identification and/or subsequent block identification to produce a first or subsequent block identification.

In a particular embodiment, a plurality of volume units is grouped as a volume unit batch and comprises a further wirelessly readable communication unit.

In a particular example, this further wirelessly readable communication unit comprises at least one radio frequency readable tag.

For the context of the present invention, any piece of equipment adapted to store and wirelessly transmit by means of an electromagnetic field an identification can be used as a wirelessly readable communication unit.

In a particular embodiment, the wirelessly readable communication unit is adapted to wirelessly transmit the identification and has a power source for that end. Alternatively, or in addition to that, for different means on the same unit, the wirelessly readable communication unit can comprise a passive tag, which gathers its power from nearby reader units to provide the exchange of identification codes.

In a particular embodiment in the system according to the present invention, each block in the network is attributed with a specific node role and connected to one or more parent and/or child node blocks. The blocks can be connected to the respective parent and/or child blocks unilaterally or bilaterally. This can mean that the block connection can be adapted for a movement of the volume unit only in one direction in the case of a unilateral connection. For safety and for providing a reckoning against forgery, it might be advised to establish vector keys for the particular node roles, for instance. This can be archived by establishing that a particular node role can only be the target of a movement into and only then a genuine reading of the wirelessly readable communication unit can be performed and stored on the digital ledger.

In a particular embodiment, the first data acquisition unit comprises a processor for running scanning algorithms adapted at identifying the identification and enriching that identification with specific block identification to generate a first block identification and/or subsequent block identification.

In a further particularly embodiment, the data acquisition unit further comprises a connector for connecting with a digital network and upload the first block identification and/or subsequent block identification onto a digital ledger. The connector can be a wireless connector, such as a WLAN connector, or a physical port, such as an USB connector.

In a further embodiment of the present invention, the data acquisition unit further comprises a memory unit. The memory unit can be a computer hardware integrated circuit adapted at storing information.

In a particularly embodiment, the wirelessly readable communication unit further comprises a power source. The power source can be a battery, such as an electrochemical cell used to provide electrical power and/or means for chemically or physically generating enough power for running the wirelessly readable communication unit. Examples of such means could be photovoltaic cells. In a particular embodiment, the battery is a rechargeable cell.

In a particular embodiment, the wirelessly readable communication unit can further comprise at least one sensor adapted at measuring environmental parameters. This embodiment can come equipped with an additional or memory adapted for storing any measurements of environmental parameters. Such environmental parameters can be for example any one or more of: temperature, pressure, humidity, acceleration, orientation and/or GPS data. MEMS can be incorporated for light, temperature, vibration, magnetism and/or chemical sensing. The wirelessly readable communication unit can be adapted at performing such a measurement at a specific interval and storing the results. With this embodiment, it becomes possible to have a track record of physical parameters during the whole lifecycle of the volume unit and thereby not only get full accountability of the genuineness of the volume unit in question but also on whether any external parameters from the selection above could have had an effect on the quality of the volume unit in question.

The wirelessly readable communication unit can be adapted at initiating a protocol on any data acquisition unit performing a reading to encrypt all the measured data and provide them by means of using a wireless communication protocol of the data acquisition unit to a dedicated server. Alternatively, or in addition, the data can be stored on the data acquisition unit. It would be also conceivable to encrypt this measured data into a code and make it part of the block identification submitted to the distributed ledger.

In a particularly embodiment, the system comprises an analytical unit that determines whether the measured environmental data lies within certain parameters. The resulting analysis is produced into an output reading as positive or negative. This output is integrated into the block identification upon reading and provides to the distributed ledger. By means of this example, a simplified mode of ensuring whether the volume unit in question has ever suffered on the environmental conditions that might have been detrimental to its quality by means of a simple binary code. In this embodiment, if required, the detailed environmental measurements can still be stored on any one of the memory units.

Further advantageous embodiments of the system are as follows:

a) The system of the present invention, whereby the data acquisition unit further comprises a memory unit.

b) The system of the present invention, whereby the wirelessly readable communication unit further comprises a power source.

A particular embodiment of the present invention relates to a container for containing a volume unit individualized from a finite amount of liquid volume. This finite amount of liquid volume is subdivided into a series of volume units, each containing a defined subset of that volume.

In a preferred embodiment this container is adapted for use in the system and/or method as previously described.

The container comprises a seal to confine the volume unit in the container.

In the context of the present invention, the seal shall not be understood as being limited to an item capable of establishing a gas or fluid tight closure of the container. The seal can be integral part of the container itself, for instance by providing a foldable container that defines a volume when folded. Example of workable seals can be a plug, a cap, a cork, a stopper, a fastener, an occlusion and/or a latch. In essence, the seal according to the present invention can be understood as any means which by applying a certain procedure is adapted at enclosing a liquid of the volume unit in the container such that leakage is provided. It is evident to a person of ordinary skill in the art, that a seal adapted to restrain a highly volatile solvent might be devised differently as one that contains beads. The extract design of the seal can be subject to the specific needs of the application of the present invention.

The container of the present invention further comprises at least one wirelessly readable communication unit. The wirelessly readable communication unit is operatively connected to the seal and/or a container surface, such that an access to an inside volume of the container is recordable by the wirelessly readable communication unit. The wirelessly readable communication unit is further capable of storing and wirelessly transferring a pregenerated identification representative of the specific liquid volume.

In a particular embodiment, at least one wirelessly readable communication unit is operatively connected to the seal, such that a reading of this pregenerated identification is possible only once the seal has been broken. In this embodiment, a final reading is not performed by the first at least one wirelessly readable communication unit but by means of a further wirelessly readable communication unit that is only accessible by means of an open container.

In a particular embodiment of the present invention, the seal comprises a layer of seals which can only be removed once a reading has been performed. Each block is intended at removing one layer of the seal and each block allows the reading only once it has been removed. With this particular embodiment the product is limited in its movement along the network until it is mandatorily removed by removing the last seal and accessing the interior of the container. In further particular embodiment of this concept, the last reading can only be performed when the last seal has been removed and the volume unit accessed, such that this last reading results in the specific volume unit being recorded as consumed, as outlined above.

In a particular embodiment, the container comprises a plurality of wirelessly readable communication units, whereby at least one of the plurality of wirelessly readable communication units is operatively connected to the seal, such that a reading of the pregenerated identification is possible only once the seal has been broken.

In a particular embodiment, the pregenerated identification comprises a sensing means to physically detect a presence of a liquid in the container. This can be done for example by having an electrical potential measured between two electrodes extending into the inside of the container, such that the electrical potential between the two electrode is different depending on whether there is a liquid inside the container or not.

A further aspect of the present invention is a computer program product comprising instructions for performing a method, preferably as a method as outlined above, on a computer. This method comprises the step of attributing to a block in a network a parameter indicative of the block node role and said parameter comprising data identifying the parent block of the block and data identifying the child block of the block.

In a preferred embodiment, each block is reflective of a particular stage in a chain of stages the volume unit moves through, and each block can be attributed with a particular block node role such as producer, distributor, retailer and/or consumer.

In a particular embodiment, a block can comprise a plurality of roles. Alternatively, each block can be limited in the number of roles it can have.

In a further particular embodiment, the role is determined for each block and cannot be altered by any user role node empowered with the authority to change the block role.

The computer program of the present invention further comprises instructions for attributing to a user node role, indicative of which of the node roles the user can interact with.

It further comprises instructions for attributing to a volume unit and identification which is reflective of the finite volume of a liquid the volume unit is a defined subset from.

The computer program product of the present invention comprises instructions for attributing an event node role reflective of an action that has been performed on or with a volume unit in questions, such as a movement, leakage, reading or even an access as previously outlined. That event node role can comprise a timestamp and a status. During a reading of a wirelessly readable communication unit associated with the volume unit by means of a first data acquisition unit, a first block identification and/or subsequent block identification is/or generated of the block node role, user node role, identification and/or event node role. This can result in a code that provides information relating to the volume unit, where it comes from, where it is heading to, what state it is in and who has done what. This code can be stored on a distributed ledger.

In a particular embodiment of the computer program product according to the present invention, it comprises instructions for performing a recording reflective of an access of the liquid of the volume unit on a distributed ledger and thereby keeping track of the total volume still not consumed and/or not tampered with.

The computer program product can, in a further embodiment, comprise instructions for further performing a localization during the attributing steps outlined above and registering the coordinates of the respective block node role, user node role, identification and/or event node role.

In a particular embodiment, the present computer program product comprises instructions for performing an attributing of a specific value to the user note role each time the user node role is used for generating a first block identification and/or subsequent block identifications.

Further advantageous embodiments of the computer program product are as follows:

a) The computer program product comprising instructions for further performing a localization during the attributing steps and registering the coordinates of the respective block node role, user node role, identification and/or event node role.

b) The computer program comprising instructions for further performing an attributing of a specific value to the user node role each time the user role is used for generating a first block identification and/or subsequent block identifications.

For a person of ordinary skill in the art, it is evident that all of the above embodiments of the aspects described can be realized in any combination, as long as they are not mutually exclusive.

For illustrating the invention further, and without being limited thereto, specific examples shall be described in the following.

Where appropriate, graphical representations are used to depict some concepts of the present invention. Therein, the same items use the same reference numbers throughout different figures.

DETAILED DESCRIPTION

Figure 1A:
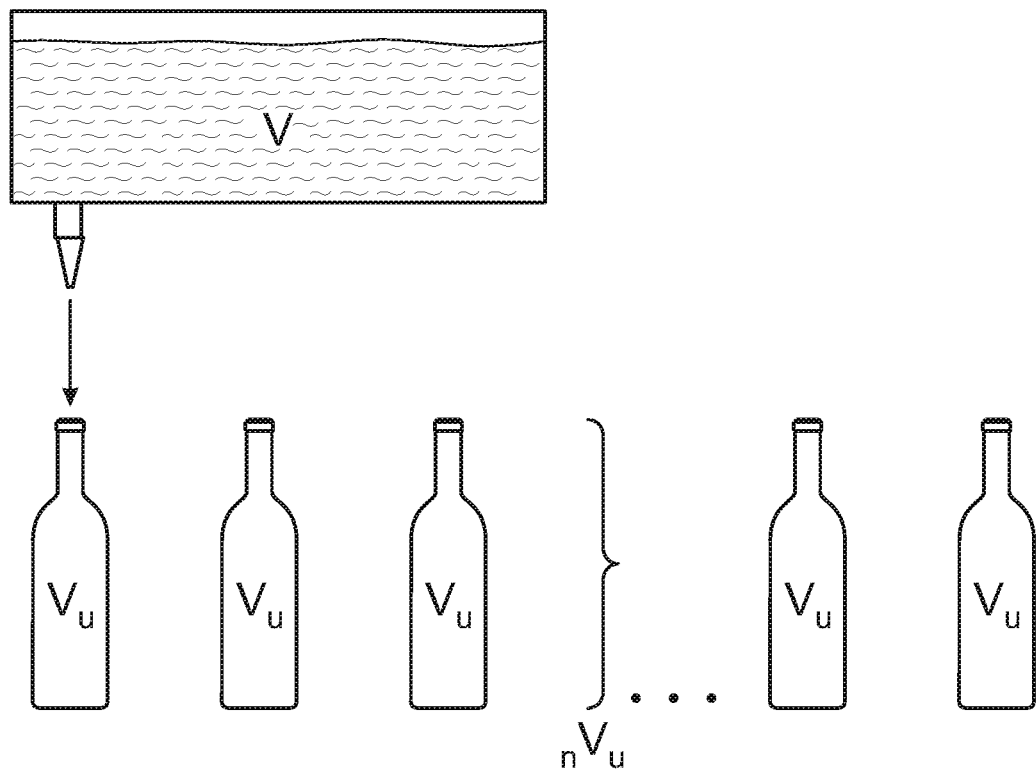
FIG. 1*a* a finite amount of liquid volume being individualized in volume units.

FIG. 1*a* shows schematically how a finite amount of liquid volume V is individualized in volume units Vu. Several volume units Vu can be grouped together, such as to form a volume unit batch nVu. In the present example three volume units Vu are grouped into one batch nVu (n=3).

Figure 1B:
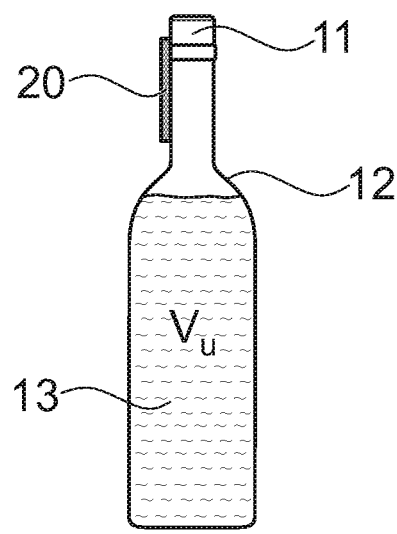
FIG. 1*b* a container with a volume unit.

The volume units Vu themselves are stored in containers 12 as schematically depicted in FIG. 1*b*. The container 12 in the present example is a bottle. The volume unit Vu is a liquid 13, that is a defined subset of the initial amount V. The bottle has a seal 11, which is a cork seal that is operably connected to the container 12 by means of an extension (not individually shown) of a wirelessly readable communication unit in the form of a combined RFID/NFC tag 20.

Figure 2:
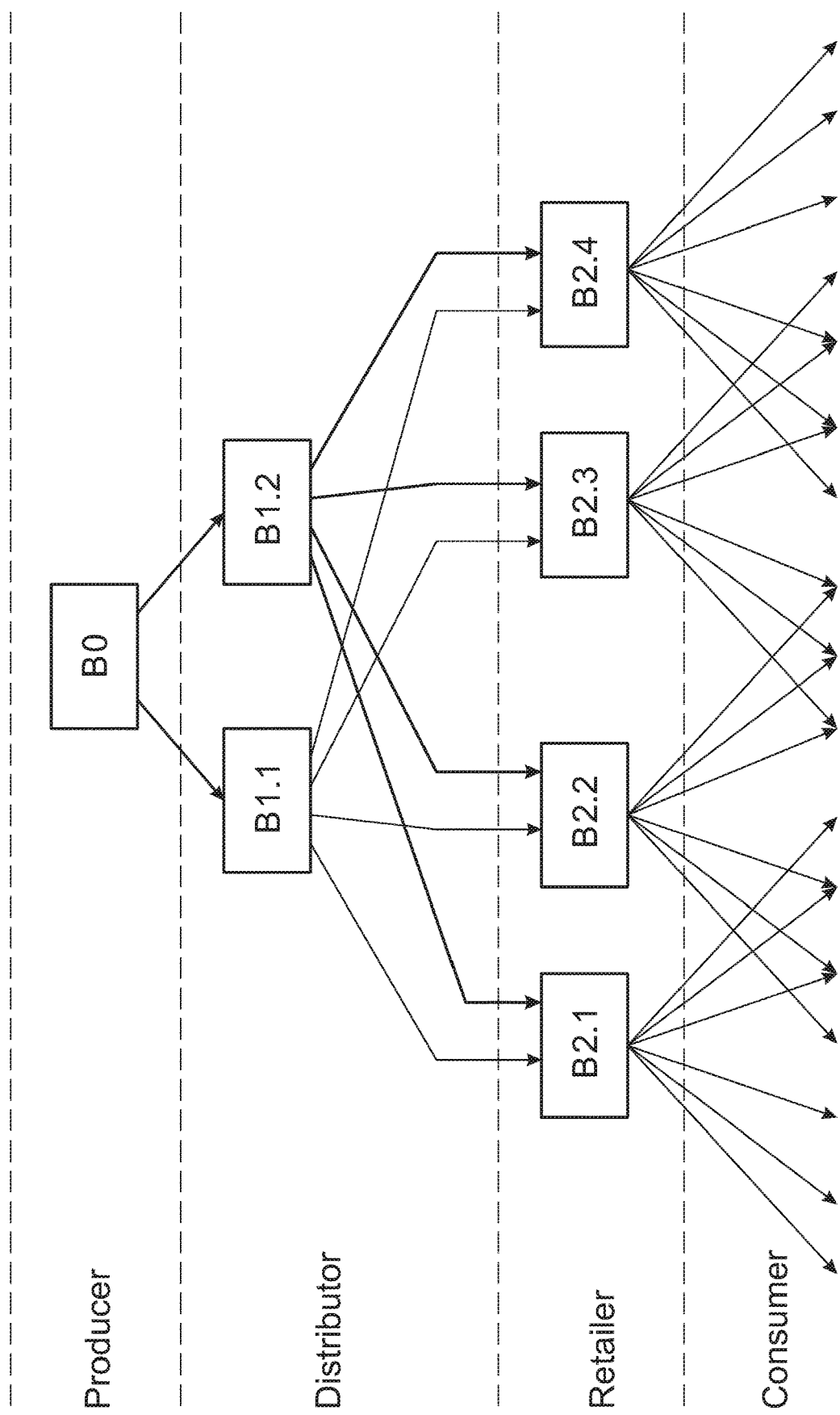
FIG. 2 a network of blocks.

FIG. 2 shows a network of blocks according to the present invention. The blocks B0, B1.1, B1.2, B2.1, B2.2, B2.3, B2.4 are organized in a hierarchical manner, with each block being connected to one or more subsequent blocks. The first block B0 is a parent block for the subsequent blocks B1.1 and B1.2, which are child blocks to the parent block B0. These blocks, again, can branch into a series of child blocks B2.1, B2.2, B2.3, B2.4 that have the previous child blocks B1.1, B1.2 as new parent blocks. In the present example, the hierarchy is built as an abstraction of a movement of volume units in a value chain. Between the blocks the movement is unidirectional and shown as movement vectors. In many fields, the vectors can be bidirectional for certain or all nodes, though. Each of the different block hierarchies can be understood as representative of a particular stage in a distribution of a volume unit, i.e. producer, distributor, retailer and finally consumer.

In the present example, the final and terminal hierarchy layer is formed by an indefinite number of consumer blocks. As a matter of fact, the number of blocks on each hierarchical level can vary and the numbers illustrated serve only as an example. Regularly, the number of blocks increases with each hierarchical layer down the ladder.

In the illustrated procedure by, every single block corresponds to a separate step on the hierarchical network and is mirrored in the distributed ledger, thereby creating a chain of register entries. This example is based on an Ethereum block chain technology. The producer generates an identification which results in the first distributed ledger entry. Upon movement of the volume unit into the first block, which is a distributor block B1, a second reading results in an enrichment of the identification with a first block identification and a respective entry into the distributed ledger. The subsequent step is a movement of the volume unit to a further block, which can either be a retailer or a further distributor. A reading then results into a subsequent block identification register entry on the distributed ledger. As a last step, the volume unit is moved into a consumer level, where movement can for instance be restricted to the consumer level, meaning that once a particular volume unit has reached the consumer level, it would no longer be possible to have a legit reading in a higher hierarchy level, such as a retailer or a distributor level. A reading at any one of these stages, but most importantly on the consumer level that happens after or during an access to the content of the container and the volume unit, results in the chain being closed and the product that is consumed in the network being registered as consumed in the chain on the digital ledger.

Each of the readings can be accompanied by further information that is specific to the reader and/or user performing the reading. As an incentive or as a control mechanism for the reading the user and/or reader can be attributed with a particular value, which is reflective of the number of readings performed. This value can be made as a requirement for subsequent readings to function, thereby incentivizing a block owner to perform the reading before moving it to the next step, as potential buyers and potential further blocks downstream have an interest at having a genuine product and thus being enabled to perform a reading. As an alternative, a positive incentive can be attributed to the value, such as a number of values resulting into a particular rebate for the acquisition of further volume units possibly of a different liquid volume from the same producer.

EXAMPLE 1

Wine Market

This example shall be discussed as an illustration of an application of the present invention following the schematics of FIGS. 1a, 1b and 2, above.

A producer of a certain finite amount of wine generates an identification ID representative of the specific liquid volume V. This identification ID can itself be a code that can be mapped to an archive entry with specific information regarding the particular liquid volume V. Alternatively or additionally, the identification ID can contain most or all of the information specific of the liquid volume. This can be achieved, for instance, by providing different factors that are to be incorporated into the identification ID with a specific code and hashing, clustering or otherwise encrypting these parameters with methods known in the art such as to generate the identification ID. For the present example, the wine producer generates an identification ID that is representative of the source of the wine (for instance the appellation), date of wine press, date of bottling, amount of volume in liters total, amount of volume in a volume unit and any quantitative or qualitative feature that the producer wants to include in the identification ID.

This identification is then integrated into a combined dual interface RFID/NFC tag. The tag has a short-range and a long-range interface suitable to be read by various devices. In the present example it is stored close to the sealing connector 20 on the bottle 12 forming the container of the individualized volume unit.

Generally, most wine bottles comprise a volume of 0.75 liters of wine. The volume unit of the present example corresponds to 0.75 l. As upon generation of the identification ID a volume of 7500 l was chosen as total liquid volume, the 0.75 l of one single volume unit corresponds to 0.01% of the total volume.

The seal 11 is a cork tap that extends into the interior volume of the bottle 13. Removal of the cork tap necessitates a breach of an antenna extension of the combined RFID/NFC tag.

In the present example, this tag serves as the wirelessly readable communication unit. The transponder of the RFID tag and the wireless protocol of the NFC tag (either Bluetooth and/or WLAN) can be read by data acquisition units of a different kind. Some of these units may be adapted to read both, but most distributor and retailer level block users have RFID capable data acquisition units, such as handheld or RFID readers to quickly perform readings on a multitude of tagged items. Consumers, on the other hand often use mobile devices, such as smartphones, that come equipped with NFC adapted reading implements.

Upon generating the code, a block chain based first producer node is generated, which can be attributed to the identification ID representative of the specific liquid volume above. This initial block chain node can be initiated by the producer.

In the present example an Ethereum based distributed ledger is used for keeping track of the transactions of the volume units in question. Starting from the initial producer node, a string of subsequent block nodes is generated for each reading of the tag. As all the node information is stored on the distributed ledger provided by blockchain technology, it becomes near impossible to tamper with the information and almost impossible to forge it.

For the sake of completeness, an Ethereum® based blockchain shall be understood under the premise of the present invention as an open-source, public, blockchain-based distributed computing platform and operating system featuring smart contract (scripting) functionality. It supports a modified version of Nakamoto consensus via transaction based state transitions. Ether is the cryptocurrency whose blockchain is generated by the Ethereum platform. Ether can be transferred between accounts and used to compensate participant mining nodes for computations performed. Ethereum provides a decentralized Turing-complete virtual machine, the Ethereum Virtual Machine (EVM), which can execute scripts using an international network of public nodes. The Ethereum blockchain described herein is only one example of a workable blockchain, that might be used in an implementation of the present invention. Other suitable blockchain or distributed ledger systems can be used as they become available, upon discretion of the skilled artisan.

The producer is attributed the producer role for the parent block B0, from which the volume units are moved into various blocks of a lower hierarchy. For some settings, the lower hierarchy blocks can already be defined at this stage. This can be achieved, for instance, by defining block node roles for all lower hierarchy blocks right at the generation of the identification. Most often, the lower hierarchy blocks are generated dynamically, though, i.e. when the volume unit in question moves into a particular block and the tag is read and the respective information is uploaded to the distributed ledger.

The step of reading the identification with a data acquisition unit, in the present example a RFID tag reader, is followed by an enrichment of the identification ID with a particular block identification to generate a first block identification for the first reading. The block identification may comprise information regarding to the node role of the reader, in this case it could be a potential distributor, the time the reading was performed, the integrity of any seals on the container, the number of readings performed at a certain time point, or in total for a particular identification ID, and an authentication with respect to the node role user. This authentication can be granted by providing access to a readers' functionalities only after a certain code has been input, or any other type of suitable access barrier has been overcome. The resulting first block identification is then uploaded onto the distributed ledger. The way these distributed ledgers work, results in the entry being distributed across a multitude of devices, each one acting as a repository for the whole chain of block nodes.

This step can be repeated for any movement of the volume unit along the value chain. It can also be repeated after a certain time the volume unit has been stored in a hierarchical level. For instance, if the distributor decides to store the wine for a certain time, the reading can be performed in regular intervals or randomly at certain time points. It is also conceivable, that, as all the block identification ID's can be consolidated into a full data set at any given time point, and such the process allows for track keeping of the storage time of the wine in question, even up to the quality of the storage the wine is being subjected to. The consolidation can be linked with software programs and applications that track the market value of the wine in dependence of the information stored on the distributed ledger. Particular vintages, for instance, can be set at a particular market value and the market value can easily be derived as a function of storage time and conditions that can be derived from the consolidated block identification.

For the present basic example, only the movement into and out of a block is registered. The next step is the movement from the distributor block to a retailer block. The correct reading of the identification ID can be made dependent of the utilized data acquisition units authorization to perform the reading. As above, this authorization can be made dependent of a user node role and/or block node role that can be activated by means of an authentication system. Such authentication means are known to the skilled artisan and can include the typing of codes by means of an interface, biometric identification and/or identification by proxy through requirement of an authentication code from a third party.

Depending on the network, the retailer can be the second last step of movement of the volume unit tracked, with the product ending in the consumers ownership right after, or a series of retailers and/or distributors are iteratively passed through; each one adding to the chain of nodes. This can be the case, when the wine in question is of a very high quality and of considerable value, for instance.

The last step of the volume unit's movement is into the hands of a consumer. Here it is possible that an access to the interior of the container, i.e. the wine itself can be registered by means of the wirelessly readable communication unit. Most often, the consumer is equipped with a smartphone and uses an app and the NFC system of the smartphone to read the tag on the volume unit. If he does so after having opened the bottle and accessed the liquid, he cannot only be certain of the genuineness of the wine he is going to savor, but also that information of that reading can be used to eliminate the particular volume unit from the balance of total volume units in distribution inside of the network.

This increases the appreciation of a wine that comes in limited bottles, such as is often the case with vintage wines of a particular appellation. At the same time, the producers or essentially any participant of the value chain can be assured of the genuineness of the wine and is informed regarding the total volume of the wine in circulation. This information is stored in an almost incorruptible system on the distributed ledger, and it becomes almost impossible to successfully create a forgery product.

EXAMPLE 2

Tracking a Liquid Waste

This application of the present invention is used to track and verify that waste with fluid properties, for instance liquid waste, is properly handled and disposed of.

The global economy, as a side-effect, has resulted in a global waste trade. For toxic or hazardous wastes, it is of special importance, that the waste is tracked along its movement in a network of distributors and waste dumps and potential depollutors.

For this waste related application, the waste producer generates the identification and defines the volume of the waste to be tracked. The waste is then moved along the different blocks, each representing a particular distributor, for instance a shipping or transport company entrusted with the task of moving the waste from its place of origin to either the terminal waste dump or the depollution center, where the waste is to be processed. Each movement into and out from a particular block is registered on the chain generated with respect to the original identification. Each block enriches this identification with a particular block identification information. Thereby the movement of the waste creates a tamper and forgery-proof record of each step it went through. The final discharging of the waste from the container where it has been stored for transportation which can be a barrel, a flask, a bottle or even a cargo container results in a removal of that waste amount from a total waste number in movement. Consolidated information from the data on the distributed ledger reflective of the particular waste batch can then be visualized to ensure that all this waste in question has reached the correct and intended addressee.

With this application of the present invention, illegal waste dumping can be prevented as every container of the waste that is sent on its journey is accounted for by each of the individual blocks it moves through.

EXAMPLE 3

Market Track of Solvents that can be Abused

Certain chemical solvents have beside legal industrial applications a usefulness for the production and manufacture of illegal substances, such as for example recreational drugs.

For this application the main benefit is the certainty to have a clear and accountable representation of all the individual volume units in a particular market and being able to exactly determine when and where a particular volume unit of the critical solvent has left the market.

The reader for this type of application can be equipped to also determine the type of use of a solvent upon accessing the container. For particularly restricted substances, the data may be consolidated by governmental units or presented to governmental units to satisfy compliance and regulatory requirements.

The application mostly follows the above patterns. The producer generates an identification for a certain lot of liquid corresponding to a finite volume to be put into the market. Each of the market participants, the distributors, retailers and consumers read the product as soon as it moves through the area of responsibility and thereby adding to a growing chain of entries onto the distributed ledger. The final consumption at the hand of a consumer is recorded as a closing of the chain and subsequent readings are no longer enabled.

EXAMPLE 4

Incentivation for Performing Readings

As mentioned above, as an incentive or a control mechanism for the reading, the user and/or reader can be attributed with a particular value, which is reflective of the number of readings per-formed. One option could be incentivizing a block owner to perform the reading before moving it to the next step, by enabling the specific value to be exchanged for further goods and/or services. A reading of a wirelessly readable communication unit can generate a value on an account of the person or entity performing the reading. The account can be linked with the particular user node role the person or entity performing the reading owns. A certain number of reading might be pooled and a bonus can be credited to the account of the person or entity reflective of the readings performed. In the example implemented by means of an Ethereum based distributed ledger, the bonus can be in form of Ether, for instance, the Ethereum based cryptocurrency. In an alternative, or additionally, the bonus can take the form of a utility token based on ethereum or other public blockchain.

Alternatively, or additionally, the value can be defined upon generation of the identification ID by the producer node user. This user can determine upon ordering the specific identification for a liquid volume the bonus that is granted with each reading, which can be, for example, a rebate on subsequent orders of further volume units or of volume units of further liquid volumes produced by the same producer. In a particular set-up, each hierarchical level can define the value for the hierchical level downstream. Thus, an owner and user of a parent node can define the value attributed to a user of a child node by performing a reading. In this set-up, the value and the associated bonus programme can be customized and tailor made for the particular user node role in question, thus a different type of bonus is generated for distributors, retailers and consumers.

The bonus system based on the value generated for a node role user can be based on an Ethereum account of the user, or any other public blockchain account of the user.

As further advantage, the invoicing of a volume unit can be handled by the reading said identification ID through the user node role owner. This reading would have to be authorized by an authentication of the person or entity performing the reading. The invoicing can be triggered directly with the upload of the first or subsequent block identification onto the distributed ledger and can, for instance, by performed directly by the user's Ether account. Alternatively, the authentication requires the payment be performed before the reading is performed. In a particular example, the reading can be performed in two steps, a first reading encrypts the identification but provides the information required by the node role user to perform the payment, which the authenticates the node role user to perform the second reading on the same volume unit, which then provides the identification ID and all associated benefits, such as the value as bonus, as above, or any graphical representation indicative of the nature, genuineness, etc. of the volume unit being read. The invoicing related to the movement of the volume units in the network can thus be made to profit directly from the smart contract feature intrinsic in the distributed ledger used.

By means of the present invention a system, method and a container arrangement is provided that provides a safe and secure way of keeping track of fluid rare goods within a network of blocks the rare good is intent move through from an initial producer up to an eventual consumer. The invention is customizable to a wide field of application and provides distinct advantages for all market and or supply chain parties involved in a movement of a contained liquid volume, by increasing safety, preventing fraud and enabling information advantage.

For the skilled artisan, this detailed description shows applications of the advantageous technology, that can be used to derive more general features, embodiments and separate inventions.

The invention claimed is:

1. A method for tracking of a finite amount of liquid volume (V) which is individualized in volume units (Vu), each volume unit (Vu) comprising a defined subset of volume from the finite amount of liquid volume (V), and whereby the liquid volume (V) is moved as volume units (Vu) and/or a volume unit batch (nVu) along a series of blocks (B1, B2, B3, Bn, . . . ) in a network (N), comprising the steps of:
   a. generating an identification (ID) representative of the specific liquid volume upon generation of said liquid volume;
   b. storing said identification (ID) on a wirelessly readable communication unit (10) applied on at least one of a single volume unit (Vu) or a single volume unit batch (nVu) of the liquid volume (V);
   c. reading said identification (ID) by means of at least one first data acquisition unit (20) upon movement of the single volume unit (Vu) into a specific block in the network (N), and enriching the identification (ID) with a specific block identification to form a first block identification and storing said first block identification on a distributed ledger (DL);
   d. repeating step c. for each movement of the single unit from a parent block into a child block thereby storing a positive integer number n of subsequent block identifications on the distributed ledger (DL) for each block the movement into is performed, and
   wherein
   e. an access to the volume unit in any one of the blocks in the network is recorded by means of the wirelessly readable communication unit and reflected in a subsequent reading of the identification (ID) as outlined in any one of steps c) and d), thereby recording the corresponding defined subset of volume of the volume unit as consumed.

2. The method according to claim 1, whereby simultaneously to step a), a first chain is generated on the distributed ledger matching the identification (ID) representative of the specific liquid volume and whereby each block identification corresponds to a node of the chain.

3. The method according to claim 1, further comprising generating a visualization representative of the specific liquid volume upon reading.

4. The method according to claim 1, whereby during the reading said identification (ID) by means of the at least one data acquisition unit (20) a localization unit generates data reflective of the place of the reading.

5. The method according to claim 1, whereby an input is generated by means of the at least one data acquisition unit (20), that generates data reflective of an event.

6. The method according to claim 1, whereby the first block identification and/or subsequent block identifications comprise information reflective of the user performing the reading according to either step c) and/or d), and reflective of the block the volume unit is moving into and/or the block the volume is moving out from.

7. The method according to claim 1, whereby a timestamp is generated with the generating of the identification (ID) and again with each reading, which is part of the enriching and the resulting first block identification and/or subsequent block identifications for storage on the distributed ledger (DL).

8. The method according to claim 1, wherein the step d) is performed with at least one second data acquisition unit (20), capable of reading NFC protocol based wirelessly readable communication from the wirelessly readable communication unit.

9. A system for tracking of a finite amount of liquid volume (V) which is individualized in volume units (Vu), each volume unit (Vu) comprising a defined subset of volume from the finite amount of the liquid volume (V), comprising:
   a. a container for containing the volume unit and having a seal to confine the volume unit;
   b. a wirelessly readable communication unit (10), operatively connected to the seal and capable of storing and wirelessly transferring a pregenerated identification (ID) representative of the specific liquid volume;
   c. a first data acquisition unit, capable of wirelessly reading the identification from the wirelessly readable communication unit;
   d. a number of blocks (B1, Bn) in a network (N), each block reflective of a particular stage in a chain of stages the volume unit moves through, and each block (B1, Bn) adapted to provide a specific block identification to the identification (ID);
   e. a distributed ledger (DL) for storing a first and any number of subsequent block identification, and wherein
   f. the wirelessly readable communication unit is adapted to record by means of being operatively connected to the seal an access to the volume unit in the container and reflect this access in any subsequent reading of the identification, such that the corresponding block identification records the volume as consumed on the distributed ledger.

10. The system according to claim 9, whereby a plurality of volume units is grouped as a volume unit batch and comprises as further wirelessly readable communication unit (10).

11. The system according to claim 9, whereby each block in the network is attributed with a specific node role and connected to one or more parent and/or child blocks.

12. The system according to claim 9, the first data acquisition unit comprising a processor for running scanning algorithm adapted at identifying the identification (ID) and enriching said identification with the specific block identification to generate a first block identification and/or subsequent block identifications.

13. The system according to claim 12, the first data acquisition unit further comprising a connector to connect with a digital network and upload the first block identification and/or subsequent block identifications onto a digital ledger (DL).

14. The system according to claim 9, the wirelessly readable communication unit (10) further comprising at least one sensor adapted at measuring environmental parameters.

15. A container for containing a volume unit individualized from a finite amount of liquid volume (V) as a defined subset of said volume the container comprising:
   a. a seal to confine the volume unit in the container;
   b. at least one wirelessly readable communication unit (10) and wherein the wirelessly readable communication unit (10) is capable of storing and wirelessly transferring a pregenerated identification (ID) representative of the specific liquid volume, and wherein
   c. the least one wirelessly readable communication unit (10) is operatively connected to the seal, such that a reading the pregenerated identification (ID) is possible only once the seal has been broken.

16. The container according to claim 15, comprising a plurality of wirelessly readable communication units (10), whereby at least one of the plurality of wirelessly readable communication units is operatively connected to the seal, such that a reading the pregenerated identification (ID) is possible only once the seal has been broken.

17. The container according to claim 15, wherein the pregenerated identification (ID) comprises a sensing means to physically detect a presence of a liquid in the container.

18. The container according to claim 15, wherein at least one wirelessly readable communication unit (10) is placed inside the container.

19. A non-transitory storage medium comprising a computer program product, comprising instructions for performing a method for tracking of a finite amount of liquid volume (V) which is individualized in volume units (Vu), each volume unit (Vu) comprising a defined subset of volume from the finite amount of liquid volume (V), and whereby the liquid volume (V) is moved as volume units (Vu) and/or a volume unit batch (nVu) along a series of blocks (B1, B2, B3, Bn, . . . ) in a network (N) on a computer comprising the steps of:
   a. attributing to a block (B1, Bn) in a network (N) a parameter indicative of a block node role, said parameter comprising data identifying the parent blocks of the block and data identifying the child blocks of the block;
   b. attributing to a user a user node role, indicative to which of the node roles the user can interact with;
   c. attributing to a volume unit an identification (ID) reflective of the finite volume of a liquid the volume unit is a defined subset of volume from;
   d. attributing to an event and event node role, said event node role comprising a timestamp and a status, and wherein e. during a reading of a wirelessly readable communication unit (10) associated with a volume unit by means of a first data acquisition unit (20) a first block identification and/or subsequent block identifications is/are generated out of the block node role, user node role, identification and event node role.

20. A computer program product according to claim 19, comprising instructions for further performing a recording of a status reflective of an access of the liquid of the volume unit on a distributed ledger and thereby keeping track of the total volume still in circulation.

* * * * *